United States Patent

Whipple et al.

[15] 3,668,956
[45] June 13, 1972

[54] MICROCIRCUIT NEGATIVE CUTTER

[72] Inventors: Douglas W. Whipple, Hampton; Earl R. Blymiller, Williamsburg, both of Va.

[73] Assignee: The United States of America as represented by the Administrator of the National Aeronatuics and Space Administration

[22] Filed: Aug. 4, 1970

[21] Appl. No.: 60,876

[52] U.S. Cl. ................................83/8, 83/522, 83/562, 83/563, 83/588
[51] Int. Cl. ............................B26d 3/08, B26d 5/02
[58] Field of Search ............83/8, 522, 563, 564, 588, 614, 83/529, 428, 562

[56] References Cited

UNITED STATES PATENTS

| | | |
|---|---|---|
| 3,459,078 | 8/1969 | Black..................................83/8 |
| 3,548,519 | 12/1970 | Oliver...............................83/522 X |
| 3,108,349 | 10/1963 | Takacs.............................83/614 X |

FOREIGN PATENTS OR APPLICATIONS 223,758   10/1962   Austria........................................83/5

*Primary Examiner*—Andrew R. Juhasz
*Attorney*—Howard J. Osborn and John R. Manning

[57] ABSTRACT

A manually operated X-Y coordinate cutter for making surface cuts with great accuracy in all three cutting dimensions. The cutting blade is rotated to cut in the X or Y direction and adjusted, in combination with a roller which contacts the work, to make cuts of uniform depth in the work. The roller and cutting blade are spring-mounted to ride smoothly over surface irregularities while maintaining a constant cutting depth. A pattern, placed between a translucent cutting surface and a translucent workpiece, is illuminated by a light box for use as a rough guide during cutting operations. X-Y dimensions of the cuts are laid out from a reference point on the pattern by positioning the cutting blade with verniers.

2 Claims, 4 Drawing Figures

INVENTORS
DOUGLAS W. WHIPPLE
EARL R. BLYMILLER
BY
*Howard J. Osborn*
ATTORNEY

MICROCIRCUIT NEGATIVE CUTTER

ORIGIN OF THE INVENTION

The invention described herein was made by employees of the National Aeronautics and Space Administration and may be manufactured and used by or for the Government of the United States of America without the payment of any royalties thereon or therefor.

This invention relates to a surface cutter for making cuts of adjustable depth with a high degree of accuracy in all cutting dimensions. The invention relates in particular to a device for cutting negatives for screen circuits and other microcircuits which require precision layout. Microcircuit negatives are presently prepared from a laminated material having a clear stabilized polyester film base covered by a thin translucent film coating applied as a lacquer and bonded to the base. One such material is available under the trade name Stabilene from the Kueffel & Esser Company. In this known process, the area of the negative which is to be screened is outlined with a razor blade or sharp cutting tool so that the translucent film coating may be peeled off. However, hand cutting is quite time-consuming and does not provide the necessary accuracy for microcircuit layout. At best, hand cutting accuracies are only plus or minus five-thousandths of an inch due to hand slipping or imprecise measurements. Often, the depth of the cut is found to be very irregular and many measurement checks of the finished microcircuit negative are required.

Accordingly, it is an object of the present invention to provide a novel surface cutter having a high degree of precision in all three cutting dimensions.

Another object of the present invention is to reduce the time required to prepare a microcircuit negative.

Another object of the present invention is to provide a ready reference for checking the general layout for the microcircuit pattern.

A further object of the present invention is to provide regulation of the depth of cut and to maintain an even cutting depth despite slight irregularities in the work material or the cutting platform.

A further object of the present invention is to provide angular accuracy between lines of cut, such angles being either 90° and 180°.

According to the present invention, the foregoing and other objects are attained by providing a cutting platform surrounded by a frame and a cutting blade and holder mechanism which transverse the cutting platform along a track slidably connected to the frame. The track moves slidably in relation to the frame in a direction perpendicular to the direction of the movement of the holder mechanism along the track. The cutting blade is adjustably positionable to cut in the direction of movement of the track or the holder mechanism and is maintained at a certain depth in relation to the cutting platform. Movement of the cutting blade over the cutting surface is accomplished manually.

The holder mechanism is equipped with a roller which movably contacts the work and is mounted in vertical and directional alinement with the cutting blade. The plane of motion of the holder mechanism is fixed by the track and the frame. The cutting blade and roller, however, may more retractably toward the holder mechanism under spring tension, allowing the roller to follow small (5 mil or less) irregularities in the work surface. Since the cutting blade and the roller are integrally connected, the roller maintains an essentially even depth of cut as the roller moves across the work. The cutting blade position is measured very accurately in the X-Y plane by a pair of vernier calipers, one for each axis of movement.

A more complete appreciation of the invention and many of the attendant advantages thereof will be readily apparent as the same becomes better understood by reference to the following detailed description when considered in connection with the accompanying drawings wherein.

Figure 1:
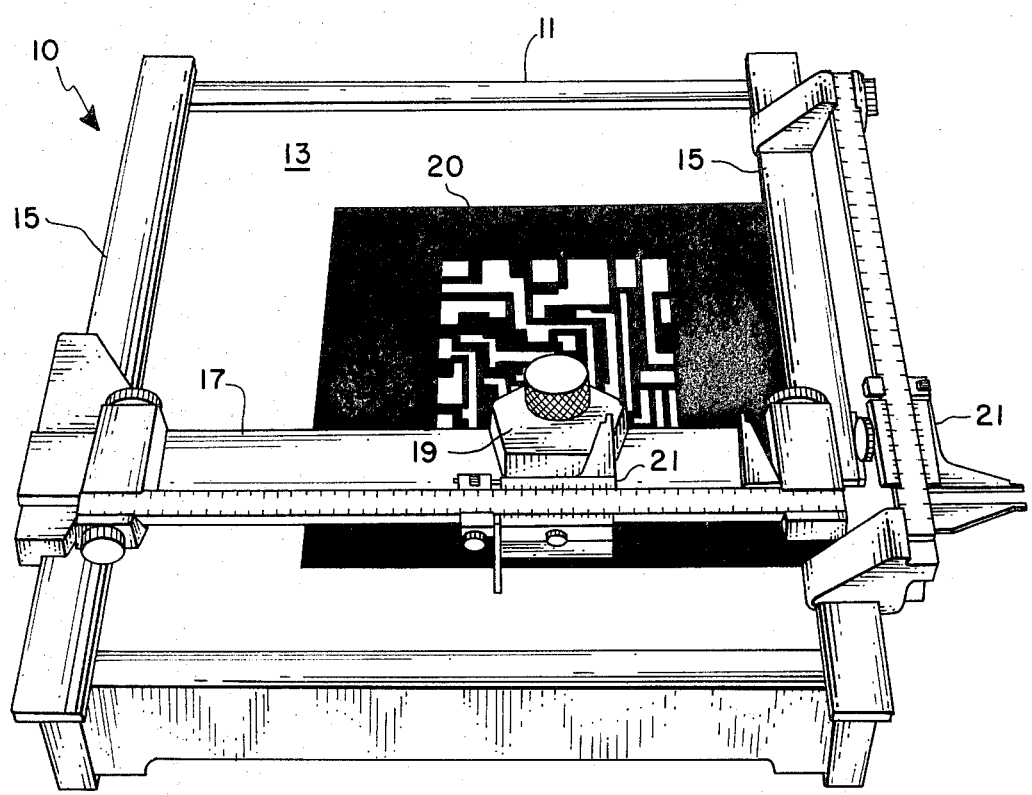
FIG. 1 is an elevational view of the assembled surface cutter.

Referring now more particularly to the drawings where like numerals designate identical parts throughout the several views, and more particularly to FIG. 1, there is shown a surface cutter 10 which includes a frame 11 completely surrounding a translucent cutting platform 13. Two opposing sides of frame 11 comprise guides 15. A track 17 slidably moves along guides 15 and traverses cutting platform 13. A holder mechanism 19 moves slidably along track 17 in a direction perpendicular to the direction of motion of track 17. The position of track 17 as it slides along one of the guides 15 and the position of holder 19 sliding along track 17 are measured by vernier calipers 21. A finished microcircuit negative 20 is shown resting on the cutting platform 13.

Figure 2:
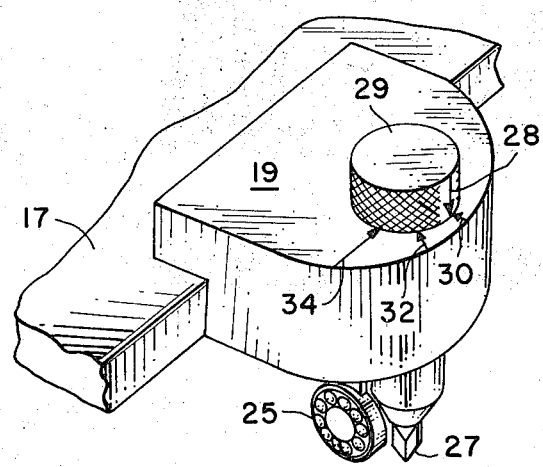
FIG. 2 is an elevational view of the holder with the roller and cutting blade attached.

Referring now to FIG. 2, a cutting blade 27 and a roller 25 are attached to holder mechanism 19. A three-position selector knob 29 equipped with a reference arrow 28 may be rotated to a first position 30 (shown), a second position 32 and a third position 34 on holder mechanism 19. This rotational movement of selector knob 29 results in a corresponding rotational movement of cutting blade 27 and roller 25 and a vertical movement of cutting blade 27 and roller 25 as will be further described hereinafter.

Figure 3:
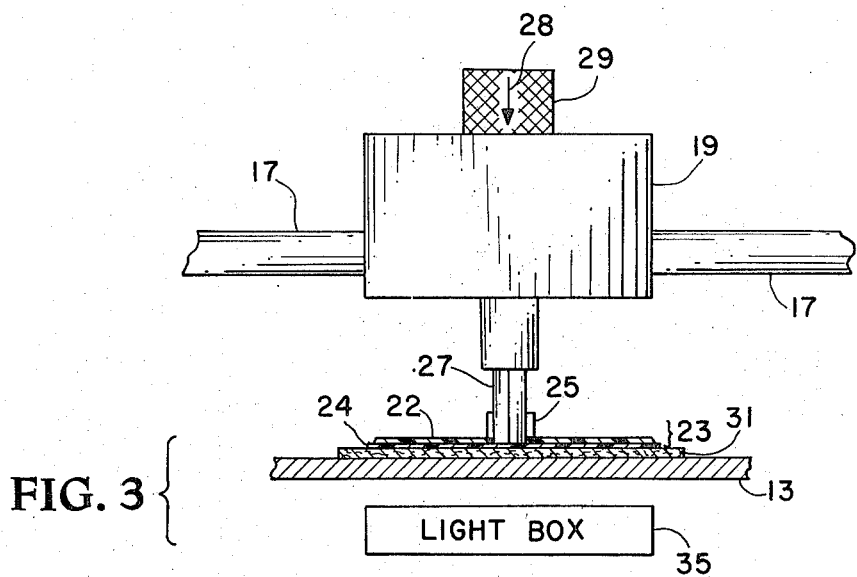
FIG. 3 is a front view, partially in section, showing the holder mechanism and the cutting blade positioned in relation to the work.

Referring now to FIG. 3, a light box 35 is positioned beneath the translucent cutting platform 13. A pattern 31 outlining the desired microcircuit negative design is placed upon cutting surface 13 and covered with a sheet of laminated film 23 composed of a clear polyester base 24 and a translucent strippable film coating comprising a layer 22 to be cut. Film of this type is commercially available under the trade name Stabilene as mentioned hereinbefore. The position of reference arrow 28 indicates that the selector knob 29 has been rotated in relation to holder mechanism 19 to give the viewer an edge-on view of cutting blade 27. Cutting blade 27 and roller 25 are now alined to cut toward the viewer in the direction of movement of track 17 (see position 30 in FIG. 2). Roller 25 rests upon the layer 22 of film 23 to be cut. Cutting blade 27 extends beyond roller 25 to a depth equal to the thickness of the layer 22 to be cut.

Figure 4:
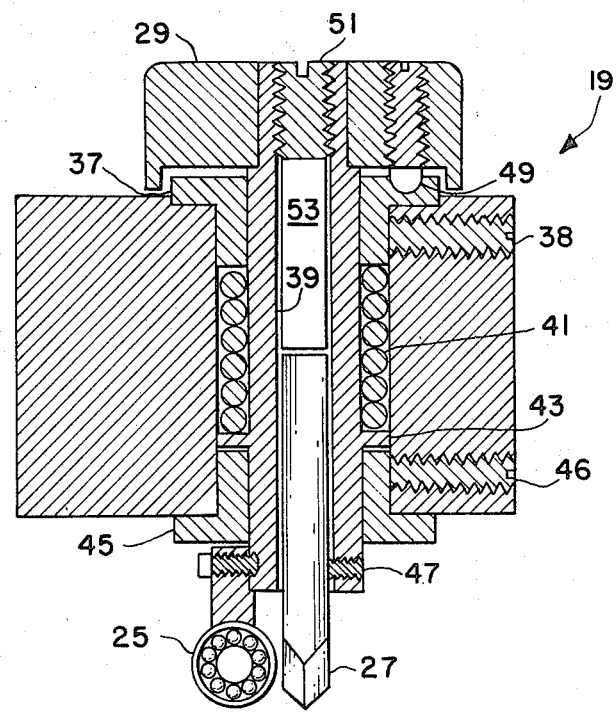
FIG. 4 is a side view, partially in section, of the holder of the holder mechanism assembly.

Referring now to FIG. 4, holder mechanism 19 includes selector knob 29 fastened to a hollow shaft 39. Cutting blade 27 slidably fits within the hollow shaft 39 and is held in place by a fastener 47. An adjusting screw 51 threadingly engages shaft 39 and may be tightened to exert a force against cutting blade 27 through a spacer 53. Shaft 39 fits slidably within an upper collar 37 and a lower collar 45. Collars 37 and 45 are held stationary in relation to holder mechanism 19 by set screws 38 and 46. A flange 43 of shaft 39 rests upon lower collar 45. A spring 41 is positioned under compression between flange 43 and upper collar 37 producing a force which tends to keep flange 43 pressed against lower collar 45. A cam follower 49 rides along a circular cam surface, not shown, as selector knob 29 is rotated. The curvature of the cam surface (not shown) causes the cutting blade 27 and roller 25 to be raised from the work whenever selector knob 29 is turned from positions 30 or 34 toward position 32 and lowered to the cutting position shown in FIG. 2 when positions 30 and 34 are selected. Notched areas are provided in the cam surface serving to receive cam follower 49 at each of the settings 30, 32 and 34.

OPERATION

The operation of the present invention is now believed apparent. When the cutter 10 is assembled and selector knob 29 is turned to a cutting position, roller 25 will be approximately five thousandths of an inch from the cutting platform. Adjusting screw 51 is loosened and cutting blade 27 is raised until the cutting tip is even with the bottom of roller 25. Fastener 27 is tightened to maintain cutting blade 27 in this position. A 3/1,000 inch shim is placed on a flat surface and holder mechanism 19 is lowered until roller 25 rests on the shim. Adjusting screw 51 is tightened until pressure is brought to bear on cutting blade 27 through spacer 53. This pressure is maintained until cutting blade 27 is moved to within one-thousandth of an inch of the flat surface. A 1/1,000-inch thick shim is used to check this distance. Pressure on cutting blade 27 is removed by releasing adjusting screw 51 and the distance from the tip of cutting blade 27 to the flat surface is rechecked. This adjustment gives cutting blade 27 a cutting depth of two-thousandths of an inch. A pattern 31 is placed upon the translucent cutting platform 13. A piece of Stabilene or the like film 23 is placed upon and alined with pattern 31. When light box 35 is turned on, pattern 31 will be visible through the translucent film 23 and may be used as a rough cutting guide. Holder mechanism 19 and attached cutting blade 27 are manually moved across the cutting platform 13 in the two perpendicular directions of motion of track 17 moving slidably along guides 15 and holder mechanism 19 moving slidably along track 17. When selector knob 29 is turned to aline the reference arrow 28 with the first position 30 cutting blade 27 is alined to cut in the direction of motion of tack 17. When selector knob 29 is turned to aline the reference arrow 28 with the third position 34, cutting blade 27 is allowed to cut in the direction of motion of holder mechanism 19 along track 17. In either the first position 30 or the third position 34, roller 25 contacts the film surface to be cut. Since the laminated sheet film 23 is approximately five thousandths inches thick, spring 41 is slightly further compressed to allow roller 25 to ride on the surface of the film. A depth of cut of two-thousandths of an inch is maintained despite irregularities in the surface of the cutting platform or the film. To begin cutting operation, cutting blade 27 is manually positioned at a zero reference at one corner of pattern 31. At the beginning of each cut, the selector knob 29 is rotated to position index arrow 28 at first position 30 or third position 34 on holder mechanism 19 depending upon the desired direction of cut. The lateral dimensions of the cut are measured from the reference point of pattern 31 by vernier calipers 21, pattern 31 being used as a rough guide to assure proper layout. At the end of each cut, selector knob 29 is rotated to aline reference arrow 28 with second position 32 raising cutting blade 27 from the cut. After all cuts have been made, according to the numerical dimension and using pattern 31 as a rough cutting guide, film 23 is removed from the cutter and its strippable film coating sections which have been cut are peeled away producing the micricircuit negative 20 shown in FIG. 1. It is thus seen that the present invention allows the production of microcircuit negative rapidly and accurately with cuts of an essentially even depth despite uneven surfaces and with precise production of lateral dimensions.

Although the invention has been describe and illustrated in detail in a specific embodiment thereof, it is to be understood that this description is by way of illustration only and is not to be taken as limiting on the applicant's invention. Obviously, there are many modifications and variations of the present invention possible in the light of the above teachings. Although no construction materials have been specified, the cutting blade is metal, the cutting platform is glass or plastic and all other parts may be made of either metal or plastic.

What is claimed as new and desired to be secured by Letters Patent of the United States is:

1. A surface cutter for making surface cuts of adjustable depth with a high degree of accuracy in all three cutting dimensions comprising:

a cutting platform;

a frame surrounding and supporting said platform;

guide means attached to opposite sides of said frame;

track means slidably connected to said guide means and movable across said cutting platform in one direction;

a holder mechanism slidably attached to said track means and movable across said cutting platform in another direction;

a hollow shaft member retractably mounted within said holder mechanism;

a cutting blade retractably mounted within said hollow shaft;

roller means attached to said hollow shaft and adapted to contact a material to be cut by said surface cutter, said roller means serving to maintain said cutting blade in spaced relation to the material to be cut, said cutting blade being retractably attached to said holder mechanism thereby permitting selective adjustment of said cutting blade in a depth direction relative to said cutting platform;

fastener means serving to maintain a position of retraction of said cutting blade relative to said roller means whereby said cutting blade gives the desired depth of cut in the work; and a spring member carried by said holder mechanism and serving to apply a force to said hollow shaft to maintain the roller means and cutting blade extended toward the cutting platform and permitting retraction of said cutting blade within said holder means, whereby the roller means is held against the material to be cut by said spring means, and smoothly traverses any slight irregularities in the surface of the material to be cut while maintaining said cutting blade at an essentially even depth of cut.

2. The surface cutter of claim 1 where the movement of the track is perpendicular to the movement of the holder mechanism relative to said track means and in a plane parallel to the cutting platform;

said holder mechanism including a three-position selector for alining said cutting blade in a first position to cut in a direction of movement of the track means, a second position to retractably remove the cutting blade from any contact with the work, and a third position to cut in a direction of movement of the holder mechanism along the track means;

said guide means and said track means including vernier scales for positioning the track means relative to said guide means, and said holder mechanism relative to said track means;

said cutting platform being formed of a translucent material, light means positionable beneath said cutting platform, pattern means consisting of opaque and translucent material attached to said cutting platform, a translucent work material superimposed on said pattern, whereby the light means serve to illuminate said cutting platform, said pattern, and said work material revealing a design to be cut by the cutting blade in said work material.

* * * * *